(12) United States Patent
Kawaguchi et al.

(10) Patent No.: US 9,564,620 B2
(45) Date of Patent: Feb. 7, 2017

(54) POWER STORAGE DEVICE

(71) Applicants: Daisuke Kawaguchi, Kanagawa (JP); Akira Iida, Tokyo (JP); Toru Suzuki, Kanagawa (JP)

(72) Inventors: Daisuke Kawaguchi, Kanagawa (JP); Akira Iida, Tokyo (JP); Toru Suzuki, Kanagawa (JP)

(73) Assignees: NEC Corporation, Tokyo (JP); NEC Engineering, Ltd., Kanagawa (JP); NEC Energy Devices, Ltd., Kanagawa (JP)

( * ) Notice: Subject to any disclaimer, the term of this patent is extended or adjusted under 35 U.S.C. 154(b) by 293 days.

(21) Appl. No.: 14/383,132

(22) PCT Filed: Mar. 15, 2013

(86) PCT No.: PCT/JP2013/057442
§ 371 (c)(1),
(2) Date: Sep. 5, 2014

(87) PCT Pub. No.: WO2013/137446
PCT Pub. Date: Sep. 19, 2013

(65) Prior Publication Data
US 2015/0044512 A1    Feb. 12, 2015

(30) Foreign Application Priority Data

Mar. 16, 2012   (JP) ................. 2012-060702

(51) Int. Cl.
H01M 2/10      (2006.01)
H01M 10/42     (2006.01)
H01M 10/0525   (2010.01)

(52) U.S. Cl.
CPC ......... *H01M 2/1022* (2013.01); *H01M 2/1077* (2013.01); *H01M 10/425* (2013.01);
(Continued)

(58) Field of Classification Search
CPC ............ H01M 10/0525; H01M 10/425; H01M 10/4257; H01M 2010/4271; H01M 2220/10; H01M 2/1022; H01M 2/1077; H01M 2/10; H01M 2/1005; H01M 2/1011; H01M 2/1016; H01M 2/1061
(Continued)

(56) References Cited

U.S. PATENT DOCUMENTS 5,140,138 A * 8/1992 Tanaka ................. H05K 5/0247
                                                                    235/1 D
2006/0056142 A1   3/2006 Takahashi et al.
(Continued)

FOREIGN PATENT DOCUMENTS

DE    102009030017 A1   12/2010
JP       59-129166 U     8/1984
(Continued)

OTHER PUBLICATIONS

Chinese Office Action corresponding to Chinese Application No. 201380014708.6, dated Nov. 30, 2015, 11 pages.
(Continued)

Primary Examiner — Nicholas P D'Aniello
Assistant Examiner — Ling R Zeng
(74) Attorney, Agent, or Firm — Wilmer Cutler Pickering Hale and Dorr LLP

(57) ABSTRACT

A power storage device including a battery containing body and a first guide rail for receiving a first end portion on a lower side of the body and a second guide rail for receiving a second end portion on an upper side of the body. The first guide rail includes a higher side plate and a lower side plate and extend in an insertion direction, and a receiving portion including a stopper. A first protrusion portion that, when removing the battery containing body, engages with the stopper, thereby preventing the battery containing body from dropping A second protrusion portion that, when the battery containing body is turned upside down, engages with the higher side plate, thereby blocking the insertion. When an attempt to remove the battery containing body from the
(Continued)

receiving portion is made, the second protrusion portion engages with the stopper, thereby preventing it from dropping.

20 Claims, 9 Drawing Sheets

(52) U.S. Cl.
CPC .......... *H01M 10/4257* (2013.01); *H01M 2/10* (2013.01); *H01M 2/1005* (2013.01); *H01M 2/1011* (2013.01); *H01M 2/1016* (2013.01); *H01M 2/1061* (2013.01); *H01M 10/0525* (2013.01); *H01M 2010/4271* (2013.01); *H01M 2220/10* (2013.01)

(58) Field of Classification Search
USPC ............................................. 429/7, 99, 100
See application file for complete search history.

(56) References Cited

U.S. PATENT DOCUMENTS

| | | | |
|---|---|---|---|
| 2006/0093899 A1* | 5/2006 | Jeon .................... | H01M 2/1072 429/99 |
| 2007/0037044 A1* | 2/2007 | Sato .................... | H01M 2/0267 429/96 |
| 2012/0129018 A1 | 5/2012 | Eckstein et al. | |
| 2012/0164500 A1 | 6/2012 | Loo et al. | |

FOREIGN PATENT DOCUMENTS

| | | | |
|---|---|---|---|
| JP | 60-027024 | U | 2/1985 |
| JP | 04-059064 | U | 5/1992 |
| JP | 11-115504 | A | 4/1999 |
| JP | 3079998 | U | 6/2001 |
| JP | 2002-057470 | A | 2/2002 |
| JP | 2004-231024 | A | 8/2004 |
| JP | 2006-079751 | A | 3/2006 |
| JP | 2006-185823 | A | 7/2006 |
| JP | 2010-182541 | A | 8/2010 |
| JP | 2011-000913 | A | 1/2011 |
| JP | 2012-009309 | A | 1/2012 |
| JP | 2012-009310 | A | 1/2012 |
| JP | 2012-009311 | A | 1/2012 |
| WO | WO-2010/149243 | A1 | 12/2010 |
| WO | WO-2011/086771 | A1 | 7/2011 |

OTHER PUBLICATIONS

Extended European Search Report corresponding to European Application No. 13761927.6, dated Jul. 23, 2015, 4 pages.
Japanese Office Action with partial English translation corresponding to Japanese Patent Application No. 2014-026028, dated Jan. 6, 2015, 5 pages.
International Search Report corresponding to PCT/JP2013/057442, dated May 7, 2013 (5 pages).

* cited by examiner

POWER STORAGE DEVICE

CROSS-REFERENCE TO RELATED APPLICATIONS

This application is a national stage application of International Application No. PCT/JP2013/057442 entitled "Power Storage Device," filed on Mar. 15, 2013, which claims the benefit of the priority of Japanese Patent Application No. 2012-060702, filed on Mar. 16, 2012, the disclosures of each of which are hereby incorporated by reference in their entirety.

TECHNICAL FIELD

The present invention relates to a power storage device.

BACKGROUND ART

Power storage devices each include a plurality of secondary batteries, and can discharge power stored in the secondary batteries as necessary. For example, the power storage devices can discharge, in the daytime, power stored late at night when the electricity rate is low, and discharge, at night, power stored in the daytime by photovoltaic power generation. Also, in case of a blackout, the power storage devices can discharge power stored in the power storage devices up to that time.

Such power storage devices have often been installed in, e.g., industrial or business establishments, but, in recent years, they are beginning to be installed more in general residential houses as well.

Currently, secondary batteries used for power storage devices are generally film-package batteries. A film package battery contains battery elements formed by alternately stacking positive plates and negative plates via separators, and the battery elements and an electrolyte solution are encapsulated in a container formed of a packaging film such as a laminate film.

Patent Literature 1 describes a power storage device in which a lithium ion battery with a plurality of cells integrally packed therein is arranged in a cuboidal casing with its periphery surrounded by metal plates. The inside of the casing is separated by a wall into right and left spaces, and in one of the spaces, the lithium ion battery and a charging unit therefor are disposed. In the other space, a controller that converts power from the battery to alternate-current power and supplies the alternate-current power is disposed, and a heat dissipation space exists between the controller and the wall.

Patent Literature 2 describes a power storage system including a battery module including a plurality of battery cells and a housing case that houses the battery module, in which charge accumulated in the battery module is converted into alternate-current power and supplied to a load. The housing case has a cuboidal shape with a surface having a largest area as a front portion, and in the housing case, a plurality of the cuboidal battery modules are housed. These battery modules are arranged in such a manner that the front portion of the housing case and a surface of each battery module that has a largest area face each other, and can be inserted/removed to/from the housing case through a side portion of the housing case. Furthermore, inside the housing case, a controller that controls conversion to alternate-current power or charging/discharging of the battery modules is disposed.

CITATION LIST

Patent Literature

Patent Literature 1: JP2010-182541A
Patent Literature 2: JP2012-9309A

SUMMARY OF INVENTION

Technical Problem

In the power storage device described in Patent Literature 1, a battery with a plurality of cells integrally packed therein is housed in a casing. Thus, at the time of work for installation, or maintenance and inspection of the battery, transfer of the entire integrated battery into and from the casing is necessary. As described in Patent Literature 1, the battery has large weight, and the work for transferring such battery in and out requires a lot of labor. Also, since the battery is an integrated one, even if a battery failure is identified, it is impossible to individually determine whether the respective cells have a failure in the battery as housed in the power storage device or transfer only a cell having a failure to and from the power storage device for repair or replacement.

In the power storage system described in Patent Literature 2, a plurality of battery modules with a plurality of cell housed therein are housed in a housing case. Such power storage device enables achievement of a compact size and easy maintenance. However, at the time of work for installation or maintenance and inspection of the power storage system, it is necessary to transfer each battery module from and to the housing case. If each battery module has large weight (for example 9 kg), a lot of labor is required for transferring a plurality of such heavy objects in and out, and thus, enhancement of workability is demanded.

Also, in the work for transferring such battery modules in and out, it is important to prevent the heavy battery modules from dropping to enhance the safety in the work and prevent occurrence of a battery module failure due to dropping. In particular, prevention of a drop of a battery module is an important issue where a battery module housing section of the housing case is placed at a relatively-high position or where the housing case has multi-tier housing sections and a battery module is housed in an upper-tier housing section.

Also, a plurality of battery modules arranged in a housing case are interconnected or connected to electronic components in the housing case, and in such connection, enhancement in efficiency of the connection work and simplification of the connection structure (for example, shortening of the cable or direct connection between the connectors) are demanded. Thus, in order to position the connectors (terminals) of the battery modules in a particular arrangement, the vertical position of each battery module when inserting the battery module may be determined. In such case, if a battery module is inserted in the wrong way, it is necessary to pull the heavy battery module out and turn and insert the heaving battery module again, resulting in a substantial decrease in work efficiency.

An object of the present invention is to provide a power storage device and a power storage system that can solve any one of the above problems.

Solution to Problem

An aspect of the present invention provides a power storage device including a battery containing body and a chassis for housing the battery containing body, wherein at a side surface portion of the chassis, an opening for inserting and removing the battery containing body via the side surface portion is provided;

the battery containing body has a flat shape and is housed and placed upright such that an end portion of the battery containing body faces the opening;

the chassis includes, inside, a first guide rail for receiving a first end portion on a lower side of the battery containing body when inserting and removing the battery containing body and a second guide rail for receiving a second end portion on an upper side of the battery containing body when inserting and removing the battery containing body;

the first guide rail includes a pair of side plates facing each other and extending in an insertion direction, the pair of side plates supporting the first end portion on the lower side of the battery containing body, one of the side plates being a higher side plate that is higher than the other side plate and the other side plate being a lower side plate that is lower than the higher side plate;

at an end portion on the opening side of the first guide rail, a receiving portion including a stopper is provided;

at a vicinity of a corner portion on a back side in the insertion direction of the first end portion on the lower side of the battery containing body, a first protrusion portion is provided such that, when removing the battery containing body, the first protrusion portion engages with the stopper, thereby preventing the battery containing body from dropping; and at a vicinity of a corner portion on the back side in the insertion direction of the second end portion on the upper side of the battery containing body, a second protrusion portion is provided such that, when the battery containing body is turned upside down, the vicinity of the back-side corner portion of the second end portion is placed on the receiving portion, and then an attempt to insert the battery containing body with the first end portion of the battery containing body received by the second guide rail and the second end portion of the battery containing body received by the first guide rail is made, the second protrusion portion engages with the higher side plate of the first guide rail, thereby blocking the insertion of the battery containing body, and when an attempt to remove the battery containing body in a direction opposite to the insertion direction from the receiving portion is made, the second protrusion portion engages with the stopper, thereby preventing the battery containing body from dropping.

Another aspect of the present invention provides a power storage system including the above power storage device, and a control system unit for controlling the power storage device.

Advantageous Effects of Invention

An exemplary embodiment of the present invention can solve any one of the above problems.

DESCRIPTION OF EMBODIMENT

Figure 1A:
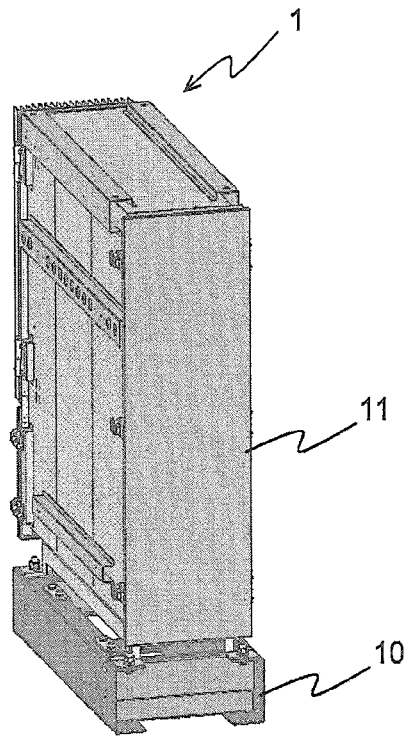
FIG. 1A is a front-side perspective view illustrating an outer appearance of a chassis of a power storage device according to an exemplary embodiment of the present invention.

A power storage device and a power storage system according to an exemplary embodiment of the present invention will be described below with reference to the drawings.

According to an exemplary embodiment of the present invention, a power storage device including a plurality of battery containing bodies (for example, battery modules or battery packs), a power conditioner (hereinafter referred to as "PCS unit"), a battery management unit (hereinafter referred to as "BMU") and a chassis that houses these can be provided, and a power storage system including the power storage device, and a control system unit (for example, a system controller) for controlling the power storage device can be also provided. The power storage device and the power storage system can be connected, for example, between a commercial power supply provided in a general household and a load such as a home appliance for use as a backup power supply or supplementary power for the case of, e.g., a blackout, and furthermore, for use for supply of extra power to the commercial power source. In households provided with a household dispersed power source such as a solar cell system or a micro wind power generator, the household dispersed power source can be connected to the power storage system.

The BMU is provided between the respective battery containing bodies, and the PCS unit and the control system unit, and collects information on the states of the respective battery containing bodies and determines the states of the respective battery containing bodies based on the collected information. Also, the BMU outputs information indicating the states of the respective battery containing bodies to the PCS unit and the control system unit based on the results of the determination.

The PCS unit converts alternate current supplied from an external power supply (e.g., a commercial power supply) to direct current and outputs the direct current to the respective battery containing bodies, and also converts direct current supplied from the respective battery containing bodies to alternate current and outputs the alternate current to the outside (a load).

The control system unit mainly includes an arithmetic processor, a memory and a program stored in the memory, and comprehensively controls the power storage device. The control system unit, for example, manages and controls information transmission between the BMU and the PCS unit, manages and controls the amounts of charge and discharge of the battery containing bodies, or switches between operation modes (a charge mode and a discharge mode) of the power storage device according to the program. The control system unit can be arranged outside of chassis 1, separately from the power storage device, using a control device such as a personal computer. Also, the control system unit may be provided in the power storage device.

The BMU is electrically connected to the battery containing bodies and the PCS unit (direct-current connection), and the PCS unit is electrically connected to the external power supply or the load (alternate-current connection). The control system unit is connected in such a manner that the control system unit can communicate with the BMU and the PCS unit.

Figure 1B:
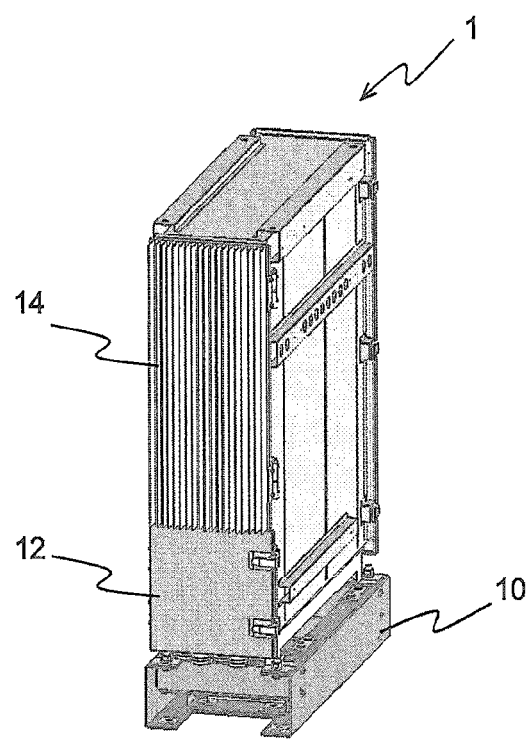
FIG. 1B is a rear-side perspective view illustrating an outer appearance of a chassis of a power storage device according to an exemplary embodiment of the present invention.
Figure 2A:
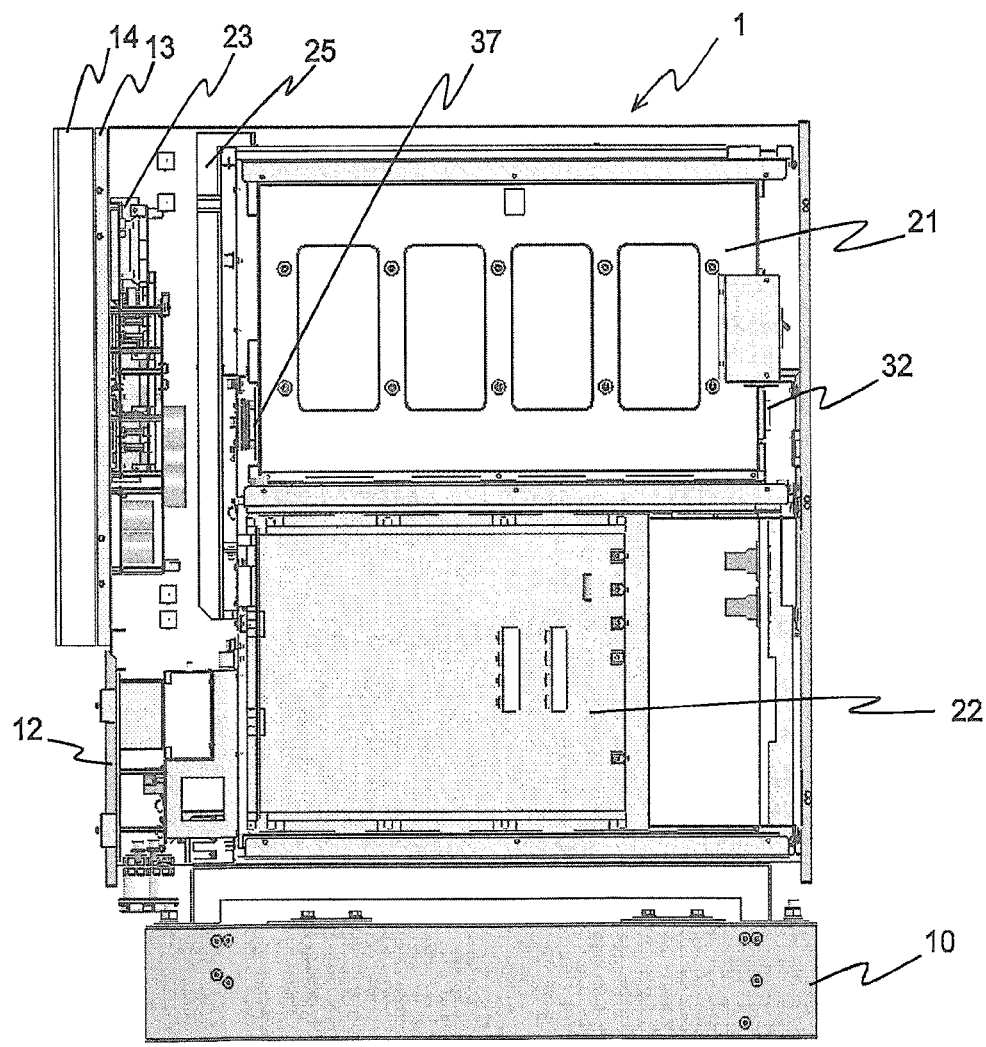
FIG. 2A is a side view for describing an inner portion of a chassis of a power storage device according to an exemplary embodiment of the present invention (with a side panel removed).
Figure 2B:
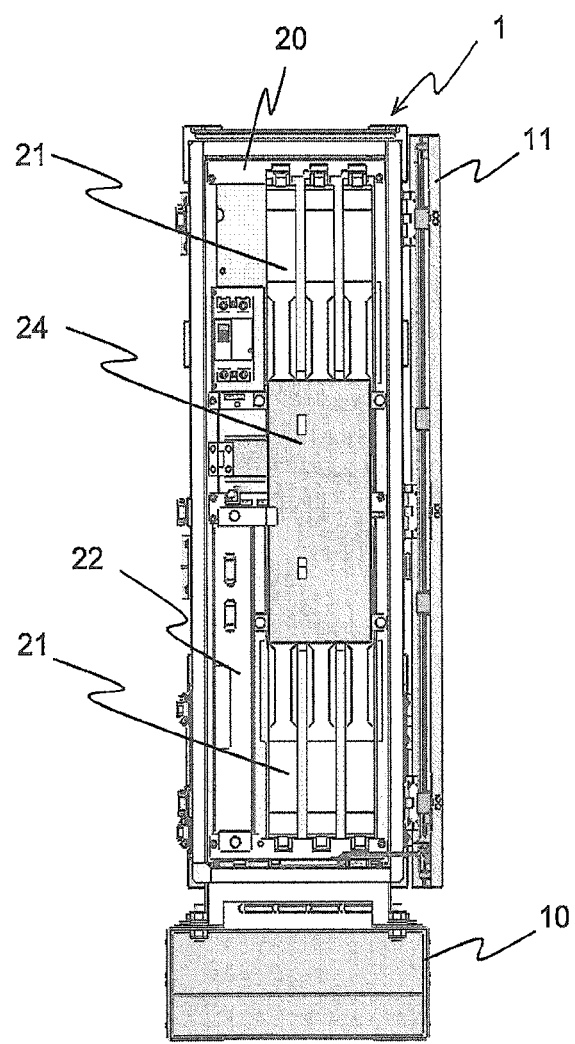
FIG. 2B is a front view for describing an inner portion of a chassis of a power storage device according to an exemplary embodiment of the present invention (with battery containing bodies housed therein and a front door opened).
Figure 3A:
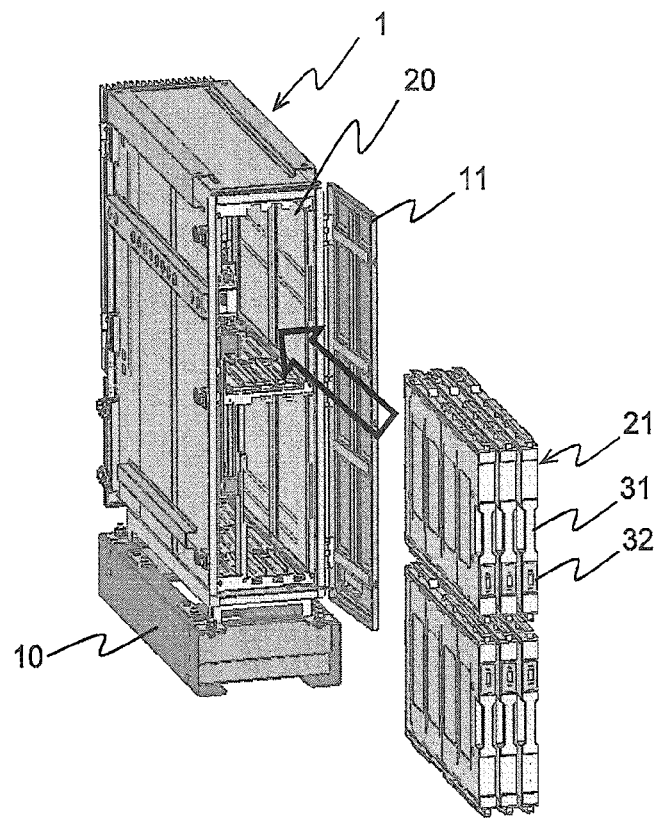
FIG. 3A is a front-side perspective view for describing a structure of a chassis of a power storage device according to an exemplary embodiment of the present invention.
Figure 4:
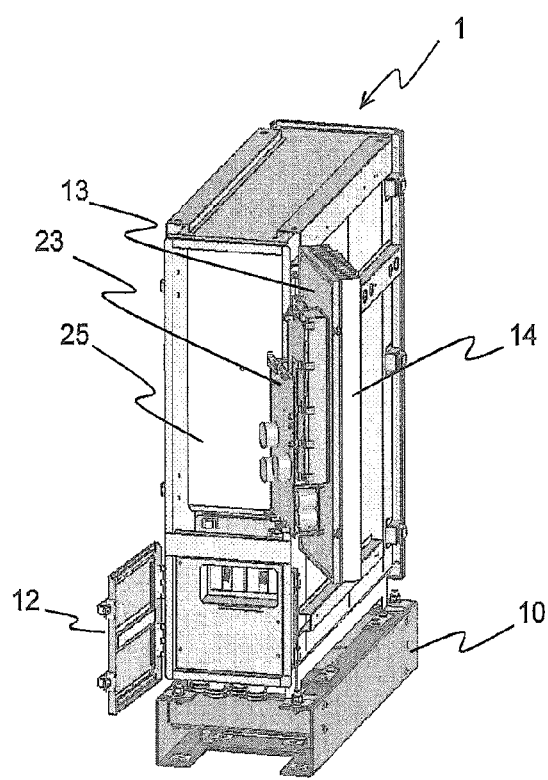
FIG. 4 is a rear-side perspective view for describing a structure of a chassis of a power storage device according to an exemplary embodiment of the present invention.

FIGS. 1A and 1B are a front-side perspective view and a rear-side perspective view illustrating an outer appearance of the chassis, respectively. FIGS. 2A and 2B are diagrams for describing the inside of the chassis: FIG. 2A is a side view with a side panel of the chassis removed; and FIG. 2B is a front view with front door 11 opened. FIGS. 3A and 4 are perspective views for describing a front-side structure and a rear-side structure of the chassis, respectively. For the chassis in the present exemplary embodiment, a cuboidal housing case, for example, a metal (for example, stainless steel) housing case having a cuboidal outer appearance, can be used. It is desirable that such chassis maintain airtightness and water-tightness sufficient for prevention of rainwater and dust intrusion. Here, in the description of the present exemplary embodiment, a surface that faces the installation surface such as the ground surface (horizontal surface) is a lower surface, and a surface on the upper side that faces the lower surface is an upper surface, and from among side surface portions forming a periphery of chassis 1, a side surface portion including opening 20 is a front surface (front). As appropriate, a direction perpendicular to the installation surface is referred to as "height direction" or "upright or vertical" and a direction that is parallel to the ground surface and along a side surface is referred to as "transverse or horizontal" or "width direction".

In the Figures, chassis 1 has a flat cuboidal shape, and a front portion and a rear portion of chassis 1 each has a vertical rectangular shape, and opposite side surface portions of chassis 1 each have a horizontal rectangular shape. A size of chassis 1 can be set to, for example, 900 mm in height, 300 mm in width of the front surface (vertically-long side surface) (length parallel to the installation surface, of a side surface provided with front door 11) and 800 mm in width of the side surfaces (horizontally-long side faces) (length parallel to the installation surface, of surfaces extending from the front door 11 side to the maintenance door 12 side).

Chassis 1 is provided with opening 20 in the vertically-long side surface (front surface), and is also provided with front door 11 (cover) for opening/closing the opening 20. As illustrated in FIGS. 1A and 3A, front door 11 can pivot about a pivot axis provided in the vicinity of an end portion of the door to open/close the opening (pivotable type), enabling enhancement in workability in installation, maintenance and inspection of the device. Instead of pivotable door 11, a detachable cover may be provided. A portion of contact between the door and the chassis is packed for keeping sufficient airtightness and water-tightness. As illustrated in FIG. 3A, each of battery containing bodies 21 can be inserted and removed through opening 20. Also, BMU 22 can be inserted and removed through opening 20.

As illustrated in FIGS. 2A and 2B, battery containing bodies 21 and BMU 22 are housed in chassis 1. Housed battery containing bodies 21 are supported by pivotable or detachable battery containing body cover 24, and thereby fixed to prevent movement of battery containing bodies 21 in the removal direction due to, e.g., shaking. Battery containing body cover 24 can be fixed via, e.g., bolt or screw fastening.

Figure 3B:
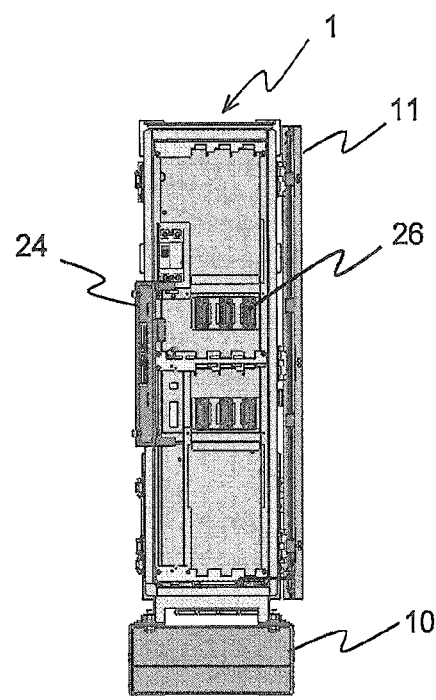
FIG. 3B is a front view for describing a structure of a chassis of a power storage device according to an exemplary embodiment of the present invention (with no battery containing bodies housed therein and a front door opened).

Battery containing bodies 21 each have a flat shape such as a flat cuboidal shape, and are arranged upright in parallel to one another so that respective end portions (vertically-long side surfaces) thereof face an opening face of opening 20. A plurality of battery containing bodies 21 are housed in each of a lower-tier housing space and an upper-tier housing space, forming a two-tier arrangement. In the example illustrated in FIGS. 2B and 3A, a total of six battery containing bodies, three on the lower tier side and three on the upper tier side, are housed. Principal surfaces (surfaces along the insertion direction and the height direction) of adjacent battery containing bodies face one another, and these principal surfaces are arranged in parallel to the side surfaces (side surfaces along a direction from the front door side to the maintenance door side) of chassis 1. Such arrangement of the flat shape battery containing bodies enables high-density housing. Also, such parallel arrangement of the plurality of upright battery containing bodies 21 can avoid the effect of the weight of the adjacent battery containing bodies compared to a case where transversely-mounted battery containing bodies are stacked, enabling prevention of occurrence of a failure due to deflection or deformation. Where a multi-tier housing space is provided to house the battery containing bodies, a support member having a strength sufficient to prevent the support member from deformation or breakage upon receipt of the full weight of the battery containing bodies housed in the upper-tier housing space is provided between the upper-tier hosing space and the lower-tier housing space. The support member is not limited to a shelf member having a mounting surface, and may be a frame or grid-shape one. FIG. 3B is a front view of the chassis with no battery containing bodies 21 housed. At a back surface of the battery containing body housing section, chassis-side connectors 26 that receive respective rear-side connectors 37 of the battery containing bodies are provided.

BMU 22 has a flat shape such as a flat cuboidal shape having a height that is similar to those of battery containing bodies 21, and is adjacent to the battery containing body arranged at an end portion of the lower-tier side arrangement, and is disposed upright so that an end portion (vertically-long side face) of the BMU faces opening 20. BMU 22 can be fixed via, e.g., bolt or screw fastening.

In a space immediately above BMU 22 (space adjacent to an end portion of the upper-tier side battery containing body arrangement), cables connected to electronic devices such as PCS unit 23 disposed on the rear side of chassis 1 can be arranged and a control panel including, e.g., a break switch can be provided.

As illustrated in FIGS. 1B, 2A and 4, on the rear side of chassis 1, maintenance door 12 and PCS-provided door 13 are provided. Heat sink 14 is provided on an outer surface of PCS-provided door 13, and PCS unit 23 is provided on an inner surface (inner-wall surface) of PCS-provided door 13. Heat insulating material 25 is provided at a position where heat insulating material 25 faces PCS unit 23 when the PCS-provided door 13 is closed.

Since heat sink 14 is provided on the outer surface of door 13 provided at the rear surface portion and PCS unit 23 is provided on the inner surface in such a manner that heat sink 14 and PCS unit 23 face each other via door 13, heat generated from PCS unit 23 can be released to the outside of the chassis by heat sink 14. Heat sink 14 may be provided integrally with PCS-provided door 13. PCS-provided door 13 with PCS unit 23 and heat sink 14 provided thereon is a pivotable one, and can open/close an opening on the upper side of the rear surface portion of the chassis body, thereby enhancing the workability in attachment or maintenance and inspection of PCS unit 23 and heat insulating material 25. Heat insulating material 25 is provided between the PCS unit 23, and housed battery containing body 21 and BMU 22. Consequently, the effect of heat generation by PCS unit 23 on battery containing bodies 21 and BMU 22 can be suppressed. A portion of contact between door 13 and chassis 1 is packed to keep sufficient airtightness and water-tightness.

Maintenance door 12 is a pivotable one, and can open/close an opening on the lower side of the rear surface portion of the chassis body, and inside the opening, fused switches, breakers or the like are arranged. Maintenance door 12 protects the switches, the breakers or the like from the external environment, and can easily be opened/closed, enhancing the workability in maintenance. A portion of contact between maintenance door 12 and chassis 1 is packed to keep sufficient airtightness and water-tightness.

As illustrated in, e.g., FIGS. 1A and 1B, chassis 1 can be installed on mount 10 and fixed via, e.g., bolts. The installation of chassis 1 on mount 10 can enhance the stability and prevent chassis 1 from falling, and can also prevent water exposure due to a puddle of rain water. Although not illustrated, in order to suppress the effects of direct sunlight and rain, a sunshade covering the upper surface of chassis 1 can be provided.

Next, a battery containing body that is suitable for the power storage device and the power storage system according to the present exemplary embodiment described above will further be described.

Figure 3C:
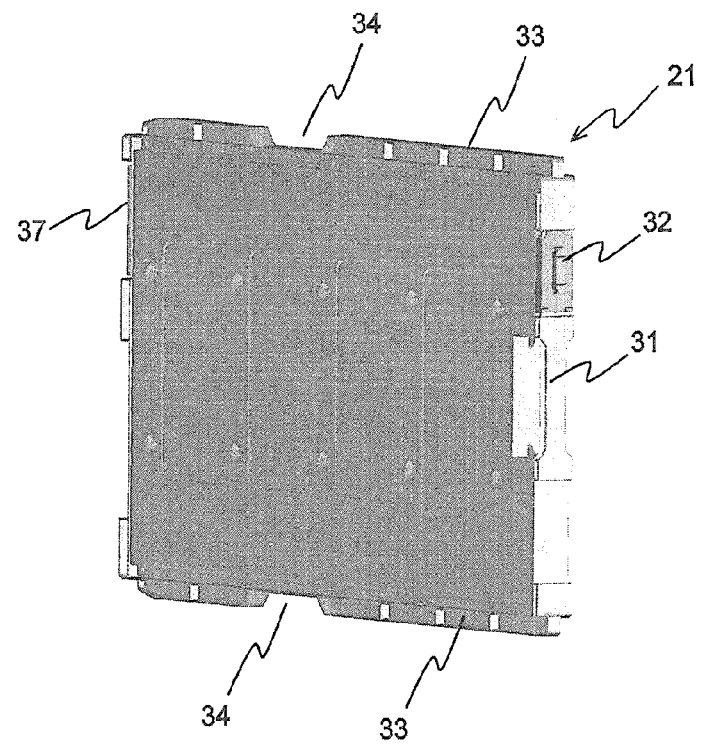
FIG. 3C is a perspective view of a battery containing body of a power storage device according to an exemplary embodiment of the present invention.

FIG. 3C is a perspective view of battery containing body 21 as placed upright. In the Figure, reference numeral 31 denotes a handle, reference numeral 32 denotes a front-side connector, reference numeral 33 denotes a projection portion for guide rail fitting, reference numeral 34 denotes a recess portion (support portion) and reference numeral 37 denotes a rear-side connector. Here, "placed upright" refers to a state in which battery containing body 21 is placed with a surface other than two principal surfaces having a largest area, as a bottom.

As illustrated in FIG. 3C, an outer appearance of battery containing body 21 can have a flat shape such as a flat cuboidal shape in which lengths in a longitudinal direction (insertion direction) of a lower end portion and an upper end portion of battery containing body 21 placed upright are longer than a length in a longitudinal direction (vertical direction) of an end portion on the front side in the insertion direction of battery containing body 21. Handle 31 is provided at the end portion on the front side in the direction of insertion to chassis 1. By holding handle 31, battery containing body 21 can easily be inserted to and removed from the power storage device.

At the end portion provided with handle 31, connector 32 is provided. The end portion faces the opening of chassis 1 when battery containing body 21 is housed in chassis 1, enabling attachment/detachment of a cable to/from connector 32 after insertion of battery containing body 21. Also, at an end portion on the opposite side of the end portion provided with handle 31 (back side in the insertion direction) of the battery containing body, a rear-side connector 37 is provided.

Battery containing body 21 is provided with recess portion 34 at least at a lower end portion thereof. At the time of insertion/removal of battery containing body 21, recess portion 34 functions as a support portion for supporting battery containing body 21 with one hand (in this case, the other hand can hold handle 31). In this case, the hand holding recess portion 34 is put in the recess portion, enabling prevention of slippage of the hand in the insertion/removal direction and thus facilitating the insertion/removal work. Also, when carrying battery containing body 21 around, recess portion 34 can be held, making it easy to hold the end portion provided with recess portion 34, and thus enabling prevention of drop of battery containing body 21 and enabling battery containing body 21 to be carried around easily. As illustrated in FIG. 3C, recess portion 34 is provided at each of the lower end portion and the upper end portion of battery containing body 21, resulting in an increase in holding position, which decreases the necessity to change the position of the battery containing body or a standing position when holding the battery containing body up, enhancing the workability. Each recess portion 34 is formed to have a size that can receive the fingers other than the thumb or the palm of a hand, making it easier to hold and enhancing the ease of holding. Each recess portion 34 is preferably provided on the back side relative to a center portion in the insertion direction. When the back side portion of the lower end portion of the battery containing body is raised with the hand that holds handle 31 as a support, the weight imposed on the other hand that holds recess portion 34 can be reduced compared to cases where the front side portion of the lower end portion is held. Also, the balance of the battery containing body is improved, whereby the battery containing body can easily be held up.

At each of the lower end portion and the upper end portion along the insertion direction of battery containing body 21, projection portions 33 that fit in respective guide rails in chassis 1 are provided. As illustrated in FIG. 3C, as the projection portions, at the lower end portion of the battery containing body, a first lower end portion-side projection portion extending in the insertion direction, and a second lower end portion-side projection portion extending in the insertion direction, which is provided apart from the first lower end portion-side projection portion, can be provided. Recess portion 34 provided at the lower end portion of the battery containing body 21 can be formed by a space between the first lower end portion-side projection portion and the second lower end portion-side projection portion. Also, as the projection portions, at the upper end portion of the battery containing body, a first upper end portion-side projection portion extending in the insertion direction and a second upper end portion-side projection portion extending in the insertion direction, which is provided apart from the first upper end portion-side projection portion, can be provided. Recess portion 34 provided at the upper end portion of the battery containing body 21 can be formed by a space between the first upper end portion-side projection portion and the second upper end portion-side projection portion.

Each battery containing body (for example, battery module) includes a plurality of secondary batteries in a case having a flat shape such as a flat cuboidal shape. At an inner surface of each of two principal surfaces of the case, a plurality of recess portions are provided, and the batteries can be arranged one by one in these recess portions. For example, a battery containing body that holds a total of eight batteries can be obtained by arranging four batteries on one principal surface and arranging four batteries on the other principal surface. The plurality of batteries in the case can be connected in series. This case can be provided with handle 31 and projection portions 33 by integral molding. Here, the arrangement, the number and the connection method of the plurality of batteries are not limited to the ones described above, and can arbitrarily be determined according to desired design specifications.

For the batteries in the battery containing bodies, film package batteries can be used. Each film package battery contains battery elements formed by alternately stacking positive electrodes and negative electrodes via separators, and the battery elements and an electrolyte solution are encapsulated in a container formed of a packaging film such as a laminate film. From the perspective of high-density housing in the case, it is desirable to use batteries having a flat cuboidal shape. For such batteries, lithium ion batteries are favorably used.

As already described with reference to FIGS. 2A, 2B and 3A, these battery containing bodies are arranged upright in parallel to one another in chassis 1. Each battery containing body is inserted with the end portion side provided with handle 31 as the front, and the end portion provided with the handle faces opening 20 (or the inner surface of closed front door 11) of the chassis. In FIG. 3A, the plurality of battery containing bodies 21 are illustrated in an integrated manner; however, the respective battery containing bodies are independent from one another and each can solely be transferred to/from chassis 1.

Battery containing bodies 21 housed in chassis 1 are connected in series, and adjacent battery containing bodies 21 are connected via a cable connecting front-side connectors 32. Each of opposite ends of the battery containing bodies connected in series is connected to BMU 22 via the cable connected to the front-side connector 32. Rear-side connectors 37 can be electrically connected to the BMU, whereby information indicating the states of the respective battery containing bodies is input to the BMU.

A reinforcement material may be attached to the outer side of chassis 1 as necessary. Also, the outer side of chassis 1 can be covered by exterior panels. For example, side panels covering opposite side surfaces and an upper panel covering the upper surface can be provided. The respective panels may be mutually fixed via rivets or welding or fixed to the chassis as necessary. Each panel can be formed using a member of a metal such as stainless steel.

Next, a structure relating to insertion/removal of battery containing bodies 21 to/from chassis 1 will further be described.

The present exemplary embodiment having the structure described below enables prevention of drop of a heavy (for example, 9 kg) battery containing body in the work for transferring the battery containing body in and out, and further enables prevention of wrong insertion of the battery containing body, consequently enabling enhancement in work efficiency. Furthermore, the efficiency of battery containing body connection work can be enhanced and the connection structure can be simplified (for example, the cable can be shortened).

FIGS. 5A to 5D are diagrams for describing a drop prevention structure for work for removal of a battery containing body, and FIGS. 6A to 6D are diagrams for describing a wrong insertion prevention structure for work for inserting a battery containing body. Here, the battery containing body in each Figure is illustrated with the side surface (principal surface) on the front side of the battery containing body case and the contents (e.g. batteries) omitted to clearly show a hollow shape of the battery containing body case.

Figure 5A:
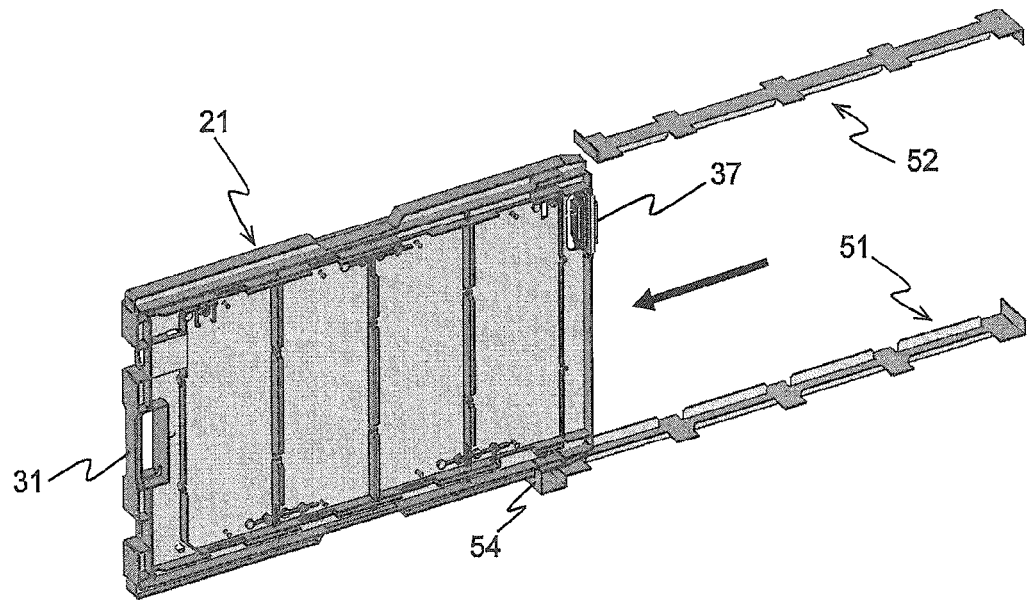
FIG. 5A is a perspective view for describing a battery containing body drop prevention structure in a power storage device according to an exemplary embodiment of the present invention.

A lower-side end portion (first end portion) of upright battery containing body 21 housed in chassis 1 is fitted in lower-side guide rail 51, and an upper-side end portion (second end portion) of the same is fitted in upper-side guide rail 52, and thereby battery containing body 21 can be inserted to and removed from the chassis 1 along these guide rails. As illustrated in FIG. 5A, when battery containing body 21 is pulled out in the direction of the arrow in the Figure from a state in which the battery containing body is inserted, as illustrated in the enlarged views of FIGS. 5B, 5C and 5D, protrusion portion (first protrusion portion) 35 provided in the vicinity of a corner portion on the back side in the insertion direction of the lower-side end portion (first end portion) of battery containing body 21 catches on stopper 54 provided at a terminal portion on the front side in the battery containing body insertion direction (the opening 20 side of chassis 1) of lower-side guide rail 51 and thereby is prevented from being pulled out any further in the arrow direction. In this case, (in a state in which protrusion portion 35 is in contact with stopper 54), the vicinity of the corner portion on the back side in the insertion direction of the lower-side end portion (first end portion) of battery containing body 21 (part within back-side region Lc from protrusion portion 35) is supported by receiving portion 53. Consequently, a drop of battery containing body 21 when pulling battery containing body 21 out can be prevented. Here, the vicinity of the corner portion on the back side in the insertion direction means a region of less than 50% of the total length in the insertion direction of the lower-side end portion (or the upper-side end portion) of the battery containing body from the corner on the back side in the insertion direction (or a site in the region), more specifically a region of 30% or less, still more specifically 20% or less of the total length in the insertion direction from the corner in the back side in the insertion direction (or a site in the region).

Figure 5B:
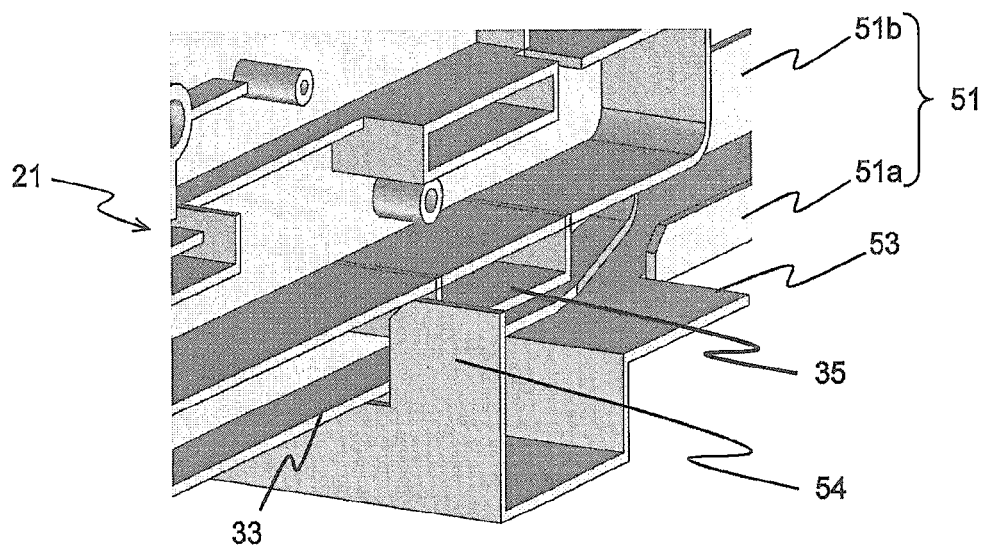
FIG. 5B is an enlarged partial perspective view for describing a battery containing body drop prevention structure in a power storage device according to an exemplary embodiment of the present invention.
Figure 5C:
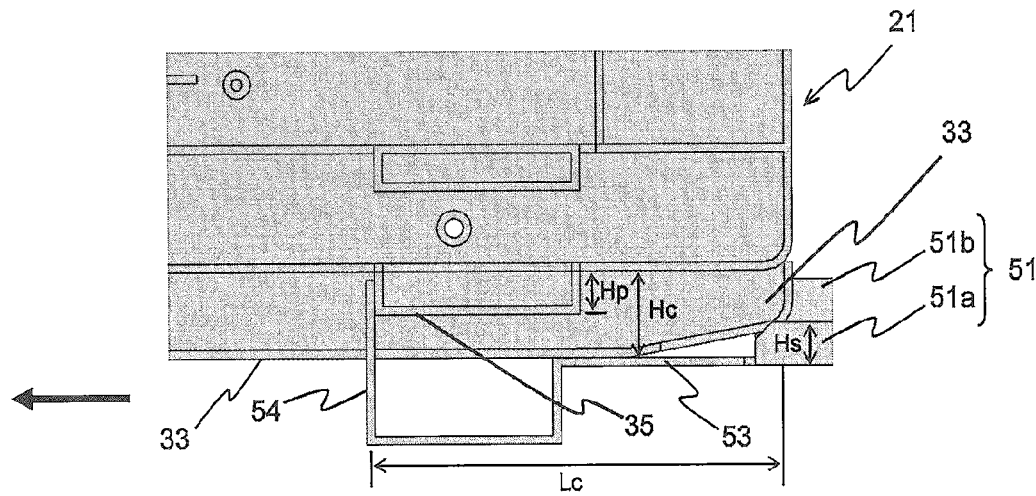
FIG. 5C is an enlarged partial side view for describing a battery containing body drop prevention structure of a power storage device according to an exemplary embodiment of the present invention.
Figure 5D:
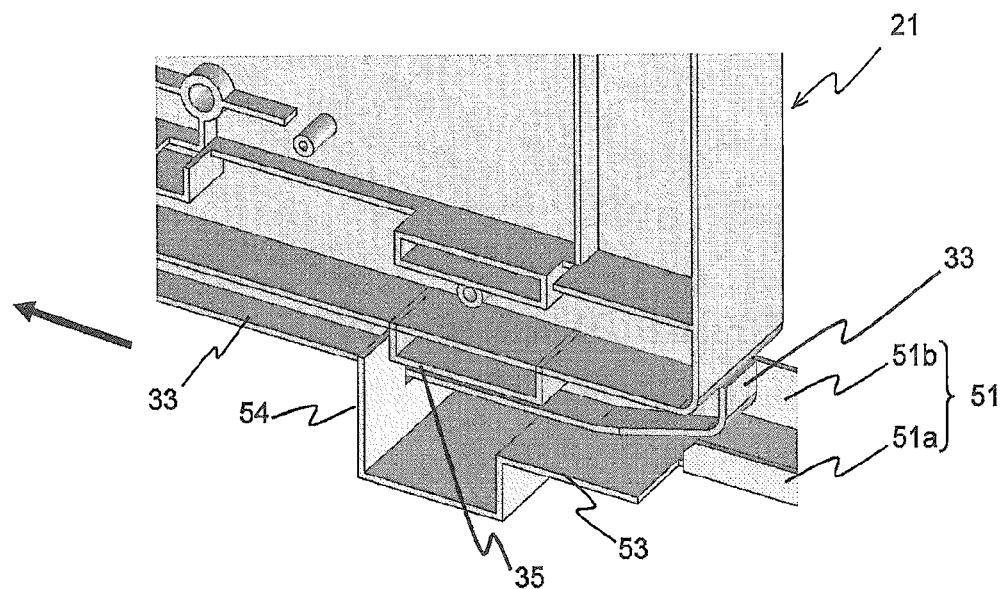
FIG. 5D is an enlarged partial perspective view for describing a battery containing body drop prevention structure in a power storage device according to an exemplary embodiment of the present invention.

As illustrated in FIGS. 5A to 5D, stopper 54 and receiving portion 53 can be integrally formed using a same member. Stopper 54 is a plate-like portion having a planar surface crossing the insertion direction of battery containing body 21 (longitudinal direction of guide rail 51) (preferably at right angles) and extending along the height direction (direction perpendicular to the power storage device installation surface). Stopper 54 formed of this plate-like portion is disposed on at least one side of a pathway which is an extension in the removal direction (in the direction of the arrow in the Figure) of a pathway for insertion and removal of the battery containing body lower-side end portion along lower-side guide rail 51. As illustrated in FIG. 3C, if the lower-side end portion (and the upper-side end portion) of the battery containing body are provided with respective projection portions 33 for guide rail fitting, stopper 54 is disposed on at least one side of the extension pathway so that stopper 54 is positioned on a side surface of projection portion 33. More specifically, as illustrated in FIGS. 5B and 5D, a recess portion in which the lower-side end portion (projection portion 33) of battery containing body 21 is to be fitted is provided in the plate-like portion, which is stopper 54, and the portion around the recess portion of the plate-like portion engages with protrusion portion 35 provided on one side of the lower-side end portion (projection portion 33) of the battery containing body (i.e., catches on the protrusion portion) and functions as a stopper.

Protrusion portion 35 provided at battery containing body 21 protrudes in a width direction of the lower-side end portion (or projection portion 33) of battery containing body 21 (that is, on the one side where stopper 54 is provided as viewed in the insertion direction) and engages with stopper (plate-like portion) 54 (i.e., catches on the stopper) when removing battery containing body 21.

Protrusion portion 35 does not come into contact with guide rail 51 when inserting battery containing body 21. While as illustrated in FIGS. 5B and 5D, protrusion portion 35 protrudes on the side plate (lower side plate 51a) side of lower-side guide rail 51, as illustrated in FIG. 5C, a height of the side plate is reduced to prevent protrusion portion 35 and the side plate (lower side plate 51a) from coming into contact with each other when inserting the battery containing body. Here, size Hp in the height direction of protrusion portion 35 is set so that a part of contact with stopper 54 has a contact region that provides sufficient engagement. Also, size Hp is set not to prevent the lower-side end portion (or projection portions 33) of battery containing body 21 from being fitted in the lower-side guide rail. If a position of a lower end of protrusion portion 35 is too close to the lower-side end portion (bottom position) of the battery containing body (that is, too close to the bottom position of lower-side guide rail 51), it is necessary to reduce height Hs of the side plate (lower side plate 51a) accordingly, resulting in insufficiency in height of the side plate, which makes battery containing body 21 easily come off from lower-side guide rail 51 when inserting battery containing body 21. If projection portion 33 for guide rail fitting is provided at the lower-side end portion of battery containing body 21, protrusion portion 35 is a protrusion portion from a side surface of the projection portion. Here, size Hp in the height direction of protrusion portion 35 is set to be smaller than height Hc of projection portion 33.

In a state in which battery containing body 21 cannot be pulled out as a result of protrusion portion 35 of battery containing body 21 engaging with stopper 54 of lower-side guide rail 51, battery containing body 21 is raised upward, whereby protrusion portion 35 and stopper 54 can be released from the engagement, enabling battery containing body 21 to be pulled out. If the vicinity of the back-side corner portion of the lower end portion of battery containing body 21 is positioned on receiving portion 53, as illustrated in FIG. 5A, no guide rail exists immediately above the vicinity of the back-side corner portion of the upper-side end portion (second end portion) of battery containing body 21, enabling battery containing body 21 to be raised smoothly. An end portion on the front side in the insertion direction of upper-side guide rail 52 is located at a position withdrawn to the back side relative to an end portion on the front side in the insertion direction of lower-side guide rail 51. The length of the withdrawal is preferably not less than a length from a position of contact between protrusion portion 35 and stopper 54 to the back-side corner portion of the lower-side end portion of the battery containing body. For removal of battery containing body 21, for example, a structure that can easily be removed to the front side by holding handle 31 and raising the handle 31 side upward with the back-side corner portion as a support (that is, tilting battery containing body 21) to release protrusion portion 35 and stopper 54 from the engagement can be provided. As illustrated in FIG. 5C, the vicinity of the back-side corner portion of the lower-side end portion of battery containing body 21 is provided with a tapered shape in which the bottom surface is inclined (gradually spaced from the ground surface) toward the back-side corner portion, enabling facilitation of the raise with the back-side corner portion as a support.

Next, a wrong insertion prevention structure for insertion of battery containing bodies 21 will be described.

Figure 6A:
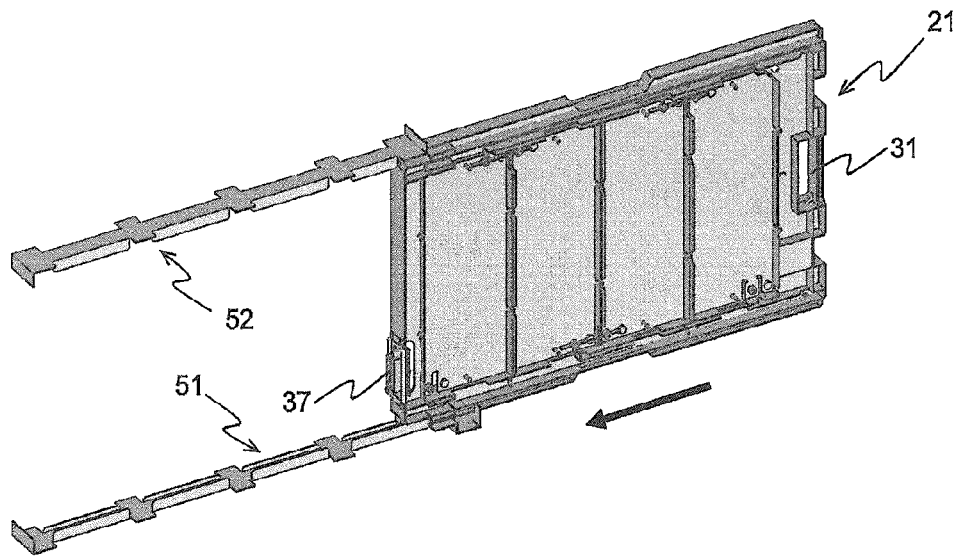
FIG. 6A is a perspective view for describing a battery containing body wrong insertion prevention structure in a power storage device according to an exemplary embodiment of the present invention.
Figure 6B:
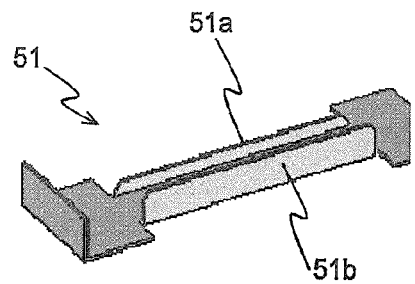
FIG. 6B is an enlarged partial perspective view for describing a battery containing body wrong insertion prevention structure (guide rail structure) in a power storage device according to an exemplary embodiment of the present invention.
Figure 6C:
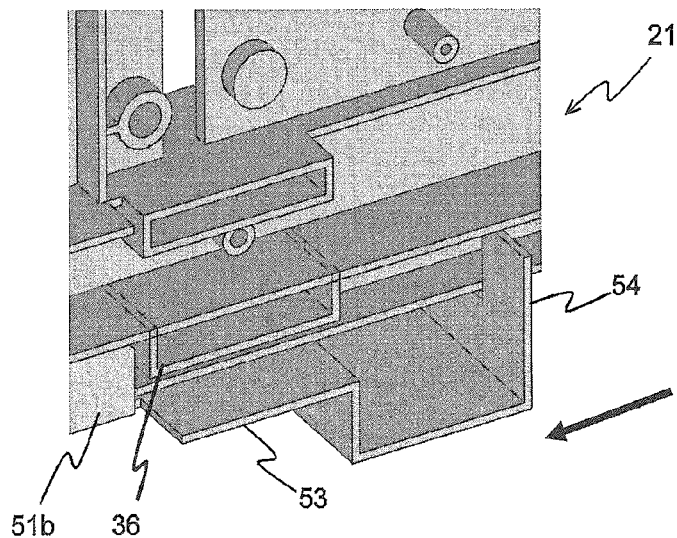
FIG. 6C is an enlarged partial perspective view for describing a battery containing body wrong insertion prevention structure in a power storage device according to an exemplary embodiment of the present invention.
Figure 6D:
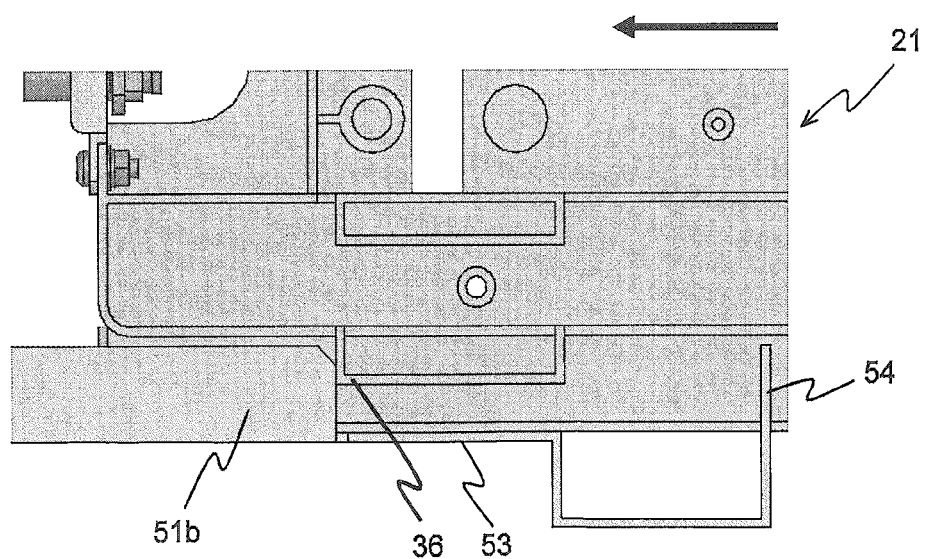
FIG. 6D is an enlarged partial side view for describing a battery containing body wrong insertion prevention structure in a power storage device according to an exemplary embodiment of the present invention.

If battery containing body 21 described above is turned upside down (that is, the first end portion on the lower side is turned up and the second end portion on the upper side is turned down) and the vicinity of the corner portion on the back side in the insertion direction of the second end portion is temporarily placed on receiving portion 53, and then is inserted with the end portions received by respective guide rails 51 and 52 (in the case of wrong insertion), the structure according to the present exemplary embodiment prevents battery containing body 21 from being inserted any further from the state illustrated in FIGS. 6A, 6C and 6D.

As illustrated in FIGS. 6A, 6C and 6D, if an attempt to insert battery containing body 21 in the arrow direction is made, second protrusion portion 36 provided in the vicinity of a corner portion on the back side in the insertion direction of the second end portion of battery containing body 21, and a guide plate (higher guide plate 51b) of lower-side guide rail 51 come into contact with each other, which prevents battery containing body 21 from being inserted any further in the direction of the arrow in the Figures. This failure to insert the battery containing body makes it easy to notice the wrong insertion.

If battery containing body 21 is pulled out in a direction opposite to the arrow in the Figures from the above state, second protrusion portion 36 catches on stopper 54 and is prevented from being pulled out any further. Here, (in a state in which protrusion portion 36 is in contact with stopper 54), the vicinity of the corner portion on the back side in the insertion direction of the second end portion of battery containing body 21 (part on the back side from second protrusion portion 36) is supported by receiving portion 53. Consequently, battery containing body 21 is prevented from being dropped when pulling out battery containing body 21. Such drop prevention structure for pull-out is similar to the above-described drop prevention structure provided by engagement between first protrusion portion 35 and stopper 54.

Second protrusion portion 36 has a structure that is similar to the drop prevention structure of first protrusion portion 35. Also, a size in the height direction of second protrusion portion 36 is set so that a part of contact with higher side plate 51b has a contact region that provides sufficient engagement. As illustrated in FIG. 3C, if projection portion 33 for guide rail fitting is provided at the second end portion (and the first end portion) of the battery containing body, second protrusion portion 36 is a protrusion portion from a side surface of the projection portion. Here, a size in the height direction of second protrusion portion 36 is set to be smaller than a height of projection portion 33.

Second protrusion portion 36 described above is provided on the side that is the same as first protrusion portion 35 as viewed in the insertion direction of the battery containing body.

As illustrated in FIG. 6B, lower-side guide rail 51 includes a pair of side plates 51a and 51b that face each other and extend in the insertion direction, the side plates 51a and 51b being capable of supporting the first and second end portions of the battery containing body. Likewise, upper-side guide rail 52 also includes a pair of side plates. As illustrated in FIGS. 5A and 6A, each guide rail can include plural pairs of side plates aligned along the insertion direction. Each guide rail can include a pair of side plates each continuously extending over the entirety in the extending direction (insertion direction) of the guide rail.

In the pair of side plates of lower-side guide rail 51, one side plate (higher side plate 51b) is higher than the other side plate (lower side plate 51b).

When the first end portion of battery containing body 21 is inserted onto lower-side guide rail 51, higher side plate 51b is positioned on the side opposite to first protrusion portion 35 as viewed in the insertion direction. Therefore, the first protrusion portion does not engage with the higher side plate. Here, although lower side plate 51a is located on the side that is the same as the first protrusion portion, lower side plate 51a is formed to be low enough to avoid engagement with the first protrusion portion, and thus the first protrusion portion does not engage with the lower side plate, either. Consequently, the first end portion of the battery containing body can be fitted in lower-side guide rail 51 and insertion of the battery containing body is not blocked. In this case, the second end portion of battery containing body 21 is fitted in upper-side guide rail 52, and second protrusion portion 36 and one side plate (on the same side) of upper-side guide rail 52, which are located on the same side as viewed in the insertion direction, are set to have respective sizes that avoid engagement therebetween.

On the other hand, if an attempt to fit the second end portion of battery containing body 21 in lower-side guide rail 51 is made, higher side plate 51b is positioned on the side that is the same as second protrusion portion 36 as viewed in the insertion direction. Therefore, the second protrusion portion engages with the higher side plate (bumps into the higher side plate), whereby insertion of the battery containing body is blocked. Upper-side guide rail 52 in this case can have a normal structure if upper-side guide rail 52 can engage with the second end portion; also, one side plate of upper-side guide rail 52 may be made larger in the height direction so as to engage with first protrusion portion 35. The side plate of upper-side guide rail 52 that engages with first protrusion portion 35 is disposed on the side that is the same as higher guide plate 51b of lower-side guide rail 51 as viewed in the insertion direction. Consequently, insertion of the battery containing body can be blocked by both the upper-side guide rail and the lower-side guide rail.

As illustrated in FIG. 3C, front-side connector 32 is provided at an end portion of each battery containing body 21, and front-side connectors 32 is disposed on the upper side or the lower side relative to a center in the height direction of the end portion of the battery containing body (for example, handle 31). Furthermore, as illustrated in FIG. 3A, battery containing bodies 21 are housed in such a manner that front-side connector 32 are arranged in parallel on the upper side or the lower side relative to handles 31. Also, as illustrated in FIG. 3A, where a lower-tier first housing section and an upper-tier second housing section are provided in the chassis and battery containing bodies 21 are arranged in parallel in each of the first and second housing sections, front-side connectors 32 of the battery containing bodies housed in the first housing section (on the lower tier side) are arranged in parallel on the upper side relative to a center in the height direction of the first housing section, and front-side connectors 32 of the battery containing bodies housed in the second housing section (on the upper tier side) are arranged in parallel on the lower side relative to a center portion in the height direction of the second housing section. Such arrangement that makes the connectors close to one another enables reduction in length of the cable interconnecting the connectors and thus enables enhancement in efficiency of work for connecting/disconnecting connectors. In such connector arrangement, the vertical positions of the battery containing bodies at the time of insertion are determined, and thus, it is necessary to prevent wrong insertion of an upside-down battery containing body.

Also, rear-side connectors 37 are provided at the respective rear-side end portions of battery containing bodies 21, and are directly connected to chassis-side connectors 26 provided in chassis 1 when battery containing bodies 21 are inserted. Such connection structure requires no cable and enables connection/disconnection between the connectors accompanying insertion/removal of battery containing body 21, enabling enhancement in work efficiency. Furthermore, as illustrated in FIG. 3B, chassis-side connectors 26 form an particular arrangement as with front-side connectors 32 described above. In other words, the chassis-side connectors are arranged in parallel on the upper side or the lower side relative to a center in the height direction of the battery containing body housing section and rear-side connectors 37 of battery containing bodies 21 as housed are also arranged so as to correspond to such arrangement. If battery containing bodies 21 are arranged in parallel in each of the first and second housing sections, chassis-side connectors 26 in the first housing section (on the lower-tier side) are arranged in parallel on the upper side relative to the center in the height direction of the first housing section, and chassis-side connectors 26 in the second housing section (on the upper-tier side) are arranged in parallel on the lower side relative to the center in the height direction of the second housing section, and rear-side connectors 37 of the battery containing bodies as housed are also arranged so as to correspond to such arrangement. In such connector arrangement, (regardless of existence or non-existence and/or arrangement of front-side connectors 32), the vertical position of each battery containing body 21 at the time of insertion is determined, and thus, it is necessary to prevent wrong insertion of upside-down battery containing body 21.

The above-described connector connection structure enables substantial improvement in efficiency of installation work and maintenance and inspection work for the power storage device, jointly with the above-described wrong insertion prevention and drop prevention structures.

The present invention has been described above with reference to the exemplary embodiments, however the present invention is not limited to the above exemplary embodiments. Various modifications that can be understood by those skilled in the art may be made to the constitution and details of the present invention within the scope thereof.

The present application claims the right of priority based on Japanese Patent Application No. 2012-60702 filed on Mar. 16, 2012, the entire disclosure of which is incorporated herein by reference.

REFERENCE SIGNS LIST 1 chassis
10 mount
11 front door (cover)
12 maintenance door
13 PCS-provided door
14 heat sink
20 opening
21 battery containing body
22 BMU
23 PCS unit
24 battery containing body cover
25 heat insulating material
26 chassis-side connector
31 handle
32 front-side connector of battery containing body
33 projection portion for guide rail fitting
34 recess portion (support portion)
35 protrusion portion (first protrusion portion)
36 protrusion portion (second protrusion portion)
37 rear-side connector of battery containing body
51 lower-side guide rail
51a lower side plate
51b higher side plate
52 upper-side guide rail
53 receiving portion
54 stopper

The invention claimed is:

1. A power storage device comprising a battery containing body and a chassis for housing the battery containing body,
wherein at a side surface portion of the chassis, an opening for inserting and removing the battery containing body via the side surface portion is provided;
the battery containing body has a flat shape and is housed and placed upright such that an end portion of the battery containing body faces the opening;
the chassis includes, inside, a first guide rail for receiving a first end portion on a lower side of the battery containing body when inserting and removing the battery containing body and a second guide rail for receiving a second end portion on an upper side of the battery containing body when inserting and removing the battery containing body;
the first guide rail comprises a pair of side plates facing each other and extending in an insertion direction, the pair of side plates supporting the first end portion on the lower side of the battery containing body, one of the side plates being a higher side plate that is higher than the other side plate and the other side plate being a lower side plate that is lower than the higher side plate;
at an end portion on the opening side of the first guide rail, a receiving portion including a stopper is provided;
at a vicinity of a corner portion on a back side in the insertion direction of the first end portion on the lower side of the battery containing body, a first protrusion portion is provided such that, when removing the battery containing body, the first protrusion portion engages with the stopper, thereby preventing the battery containing body from dropping; and
at a vicinity of a corner portion on the back side in the insertion direction of the second end portion on the upper side of the battery containing body, a second protrusion portion is provided such that,
when the battery containing body is turned upside down, the vicinity of the back-side corner portion of the second end portion is placed on the receiving portion, and then an attempt to insert the battery containing body with the first end portion of the battery containing body received by the second guide rail and the second end portion of the battery containing body received by the first guide rail is made, the second protrusion portion engages with the higher side plate of the first guide rail, thereby blocking the insertion of the battery containing body, and
when an attempt to remove the battery containing body in a direction opposite to the insertion direction from the receiving portion is made, the second protrusion portion engages with the stopper, thereby preventing the battery containing body from dropping.

2. The power storage device according to claim 1, wherein the second guide rail comprises a pair of side plates facing each other and extending in the insertion direction, the pair of side plates supporting the second end portion of the battery containing body, one of the side plates being a higher side plate that is higher than the other side plate and the other side plate being a lower side plate that is lower than the higher side plate;
the higher side plate of the first guide rail and the higher side plate of the second guide rail are arranged on a same side as viewed in the insertion direction of the battery containing body; and
when the battery containing body is turned upside down, the vicinity of the back-side corner portion of the second end portion is placed on the receiving portion, and then an attempt to insert the battery containing body with the first end portion of the battery containing body received by the second guide rail and the second end portion of the battery containing body received by the first guide rail is made, the first protrusion portion engages with the higher side plate of the second guide rail, thereby blocking the insertion of the battery containing body.

3. The power storage device according to claim 1, wherein the first protrusion portion protrudes on the lower side plate side as viewed in the insertion direction of the battery containing body such that the first protrusion portion does not engage with the lower side plate of the first guide rail when inserting the battery containing body; and
the second protrusion portion protrudes on a side that is the same as the first protrusion portion.

4. The power storage device according to claim 1, wherein the stopper includes a recess portion capable of fitting with each of the first end portion and the second end portion of the battery containing body;

when removing the battery containing body with the first end portion positioned on the lower side from the chassis, a portion around the recess portion of the stopper and the first protrusion portion engage with each other; and when removing the battery containing body with the second end portion positioned on the lower side from the receiving portion, the portion around the recess portion of the stopper and the second protrusion portion engage with each other.

5. The power storage device according to claim 1, wherein a first projection portion for fitting in the first guide rail is provided at the first end portion of the battery containing body; and a second projection portion for fitting in the second guide rail is provided at the second end portion of the battery containing body.

6. The power storage device according to claim 5, wherein the stopper includes a recess portion capable of fitting with each of the first projection portion and the second projection portion of the battery containing body;

when removing the battery containing body with the first end portion positioned on the lower side from the chassis, a portion around the recess portion of the stopper and the first protrusion portion engage with each other; and when removing the battery containing body with the second end portion positioned on the lower side from the receiving portion, the portion around the recess portion of the stopper and the second protrusion portion engage with each other.

7. The power storage device according to claim 1, further comprising a battery management unit, wherein the battery management unit is disposed adjacent to the battery containing body.

8. The power storage device according to claim 1, wherein the battery containing body includes a connector provided at the end portion facing the opening.

9. The power storage device according to claim 1, wherein more than one said battery containing body is included, and the respective battery containing bodies are arranged upright in parallel such that end portions of the battery containing bodies face the opening.

10. The power storage device according to claim 9, further comprising a battery management unit, wherein the battery management unit has a flat shape and is placed upright adjacent to a battery containing body at an end of the arrangement of the battery containing bodies.

11. The power storage device according to claim 9, wherein each of the battery containing bodies includes a connector provided at the end portion facing the opening;

the connector is disposed on an upper side or a lower side relative to a center in a height direction of the end portion of the battery containing body; and the battery containing bodies are housed such that the connectors are arranged in parallel on the upper side or the lower side relative to the center portions in the height direction of the end portions of the respective battery containing bodies.

12. The power storage device according to claim 9, wherein the chassis includes a first housing section on a lower tier side and a second housing section on an upper tier side, and the battery containing bodies are arranged in parallel in each of the first and second housing sections.

13. The power storage device according to claim 9, wherein the chassis includes a first housing section on a lower tier side and a second housing section on an upper tier side, and the battery containing bodies are arranged in parallel in each of the first and second housing sections;

a connector is provided at the end portion of each battery containing body, the end portion facing the opening;

the connectors of the battery containing bodies housed in the first housing section are arranged in parallel on the upper side relative to a center in the height direction of the first housing section; and the connectors of the battery containing bodies housed in the second housing section are arranged in parallel on the lower side relative to a center portion in the height direction of the second housing section.

14. The power storage device according to claim 1, further comprising a power conditioner.

15. The power storage device according to claim 14, wherein the chassis has a cuboidal shape including a first side surface portion including the opening, and a second side surface portion facing the first side surface portion; and the power conditioner is installed on an inner wall surface of the second side surface portion.

16. The power storage device according to claim 1, wherein the chassis includes a cover body that can open and close the opening.

17. The power storage device according to claim 1, wherein the battery containing body holds a film package battery.

18. The power storage device according to claim 1, wherein the battery containing body holds a lithium ion secondary battery.

19. The power storage device according to claim 1, wherein the battery containing body is a battery module.

20. A power storage system comprising the power storage device according to claim 1, and a control system unit for controlling the power storage device.

* * * * *